(12) United States Patent
Lekutai et al.

(10) Patent No.: US 11,849,354 B2
(45) Date of Patent: Dec. 19, 2023

(54) MANAGING A BASEBAND NETWORK POLICY

(71) Applicant: T-Mobile Innovations LLC, Overland Park, KS (US)

(72) Inventors: Gaviphat Lekutai, Kirkland, WA (US); Alan Denis MacDonald, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 60 days.

(21) Appl. No.: 17/553,365

(22) Filed: Dec. 16, 2021

(65) Prior Publication Data

US 2023/0199561 A1 Jun. 22, 2023

(51) Int. Cl.
*H04W 28/08* (2023.01)
*H04W 72/51* (2023.01)

(52) U.S. Cl.
CPC ... *H04W 28/0925* (2020.05); *H04W 28/0967* (2020.05); *H04W 72/51* (2023.01)

(58) Field of Classification Search
CPC ......... H04W 28/0925; H04W 28/0967; H04W 72/51
See application file for complete search history.

(56) References Cited

U.S. PATENT DOCUMENTS

| | | | |
|---|---|---|---|
| 2015/0201402 A1* | 7/2015 | Morioka | H04W 72/0446 370/329 |
| 2016/0150533 A1* | 5/2016 | Webb | H04W 72/044 370/329 |
| 2021/0100003 A1* | 4/2021 | Liu | H04W 72/23 |
| 2023/0036057 A1* | 2/2023 | Lei | H04W 72/1263 |
| 2023/0039152 A1* | 2/2023 | Bai | H04L 5/005 |

* cited by examiner

*Primary Examiner* — Kashif Siddiqui
(74) *Attorney, Agent, or Firm* — SHOOK, HARDY & BACON L.L.P.

(57) ABSTRACT

Systems, methods, and computer-readable media herein dynamically adjust the policies used within a core network. These policies are determine based on the identification of a user device being a reduced capability device and the data requirements for that device. A correlation between the type of reduced capability device and the data requirements is used to derive data-drive insights using a near-real time RAN intelligence controller. The data used to determine these insights and policies are based near-real time sources.

17 Claims, 5 Drawing Sheets

MANAGING A BASEBAND NETWORK POLICY

SUMMARY

A high-level overview of various aspects of the invention is provided here as an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, systems, methods, and computer-readable media that employ information related to a user device and its requirements to dynamically adjust the protocols or policies implemented on a network baseband in order to more efficiently plan for and service reduced capability devices being connected to that network.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of select aspects of the present invention is described with specificity herein to meet statutory requirements. The Detailed Description is not intended to define what is regarded as the invention, which is the purpose of the claims. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AWS Advanced Wireless Services
BRS Broadband Radio Service
BTS Base Transceiver Station
CDMA Code Division Multiple Access
EBS Educational Broadband Services
eNodeB Evolved Node B
EVDO Evolution-Data Optimized
gNodeB Next Generation Node B
GPS Global Positioning System
GSM Global System for Mobile Communications
HRPD High Rate Packet Data
eHRPD Enhanced High Rate Packet Data
LTE Long Term Evolution
LTE-A Long Term Evolution Advanced
PCS Broadband Personal Communications Service
RNC Radio Network Controller
SyncE Synchronous Ethernet
TDM Time-Division Multiplexing
VOIP Voice Over Internet Protocol
WAN Wide Area Network
WCS Wireless Communications Service
WiMAX Worldwide Interoperability for Microwave Access Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Aspects described herein may be embodied as, among other things, a method, system, or computer-program product. Accordingly, the aspects described herein may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

At a high level, systems, methods, and computer-readable media of the present invention identify user devices connected to a network as reduced capability ("redcap") devices and further identifies network requirements of the connected redcap devices. This information is collected from network RAN sources at near real-time (less than 0.5 seconds). The data is then correlated and insights are determined which may then be used to create a policy or operating procedure to be put into place on the O-RAN baseband. These policies may be used to direct groups of redcap devices and/or network functions continuously. Thus, network functions are optimized with the increased usage of a large variety of type of redcap devices.

In a first aspect of the present invention, a method for managing a baseband network policy is provided. That network policy is used to direct the traffic steering of the network or other behaviors of the network or network devices. The method comprises determining that a first user or group of user devices are reduced capability devices, the user devices being associated with a first base station. The method further comprises determining that the user devices are a particular type of reduced capability device. Additionally, the method determines the data requirements of the reduced capability device. In aspects, a traffic steering policy is determined based on the type of redcap devices and the data requirements of those devices. Once the policy is determined, the policy is implemented on the network by way of a near real-time RAN intelligent controller.

In a second aspect of the present invention, computer-readable media is provided, the computer-readable media having computer-executable instructions embodied thereon that, when executed, perform a method for managing a baseband network policy. The method comprises determining that a first user or group of user devices are reduced capability devices, the user devices being associated with a first base station. The method further comprises determining that the user devices are a particular type of reduced capability device. Additionally, the method determines the data requirements of the reduced capability device. In aspects, a traffic steering policy is determined based on the type of redcap devices and the data requirements of those devices. Once the policy is determined, the policy is implemented on the network by way of a near real-time RAN intelligent controller.

In a third aspect of the present invention, a system is provided for managing a baseband network policy. The system comprises a method comprising determining that a first user or group of user devices are reduced capability devices, the user devices being associated with a first base station. The method further comprises determining that the user devices are a particular type of reduced capability device. Additionally, the method determines the data requirements of the reduced capability device. In embodiments, a traffic steering policy is determined based on the type of redcap devices and the data requirements of those devices. Once the policy is determined, the policy is implemented on the network by way of a near real-time RAN intelligent controller. determining that a first user device is a reduced capability device, the first user device being associated with a first base station. The system further comprises determining that the user device is a particular type of reduced capability device. Additionally, the system determines the data requirements of the reduced capability device. In embodiments, a traffic steering policy is determined based on the type of redcap device and the data requirements of that device. Once the policy is determined, the policy is implemented on the network Turning now to FIG. 1, an example of a network environment 100 suitable for use in implementing embodiments of the present disclosure is provided. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 1:
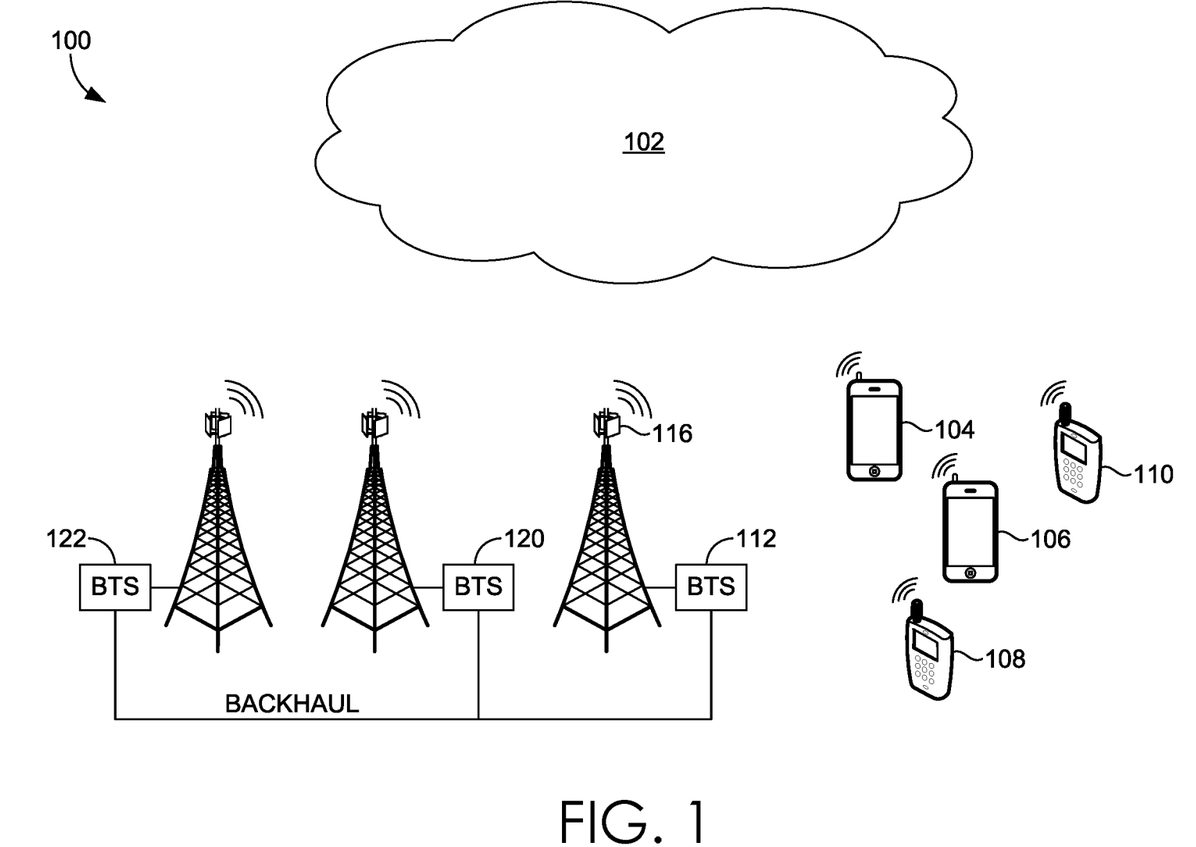
FIG. 1 depicts a schematic for an exemplary device, in accordance with an aspect of the present invention.

The network environment 100 includes a network 102 that provides service to current User Equipment (UE) 104 and 106 and one or more legacy UE 108 and 110. The network 102 may be accessible through a base station 112 that is connected to a backhaul server (not shown). The base station 112 and/or a computing device (e.g., whether local or remote) associated with the base station 112 may manage or otherwise control the operations of components of a cell site, including an antenna array 116. The base station 112 and/or the computing device associated with the base station 112 may include one or more processors and computer-readable storage media having computer-executable instructions or computer instruction modules embodied thereon for execution by one or more processors. These computer executable instructions may be used to implement policies designed to govern the behaviors of network devices such as UE 104, antenna array 116, base stations 112.

The antenna array 116 may radiate in a particular direction and, thus, may correspond to a particular sector of a cell site. The antenna array 116 may have a plurality of antenna elements, in embodiments. In one embodiment, the antenna array 116 is configured to have a plurality of elements that in number, arrangement, and/or density, are configured for mMIMO. In one such embodiment, the base station 112 may include a radio and/or a controller, such as a Massive Multiple-Input Multiple-Output Unit for controlling a mMIMO configured antenna array, such as the antenna array 116 having a plurality of antenna elements. The base station 112 may use the controller to monitor one or more of throughput, signal quality metrics (e.g., SINR), a quantity of unique users/subscribers, a quantity of unique UE(s), and/or remote location filings that occur at the base station, all of which may be monitored dynamically and/or as stored in a data store. The antenna array may also be configured to operate under a lower order number of antenna elements than the antenna array as configured to operate under a mMIMO configuration. Such a lower order configuration may be a legacy system such as an eight branch transmit and eight branch receive (8T8R) antenna structure. Each of these operations described above may be modified or governed by network policies operating on the network baseband.

The base station 112 may use a radio that is connected to the antenna array 116 by a physical RF path, where the radio is used to cause the antenna array 116 to transmit radio-frequency signals using the plurality of antenna elements. The plurality of antenna elements in the antenna array 116 may include portions of antenna elements (not shown). In embodiments, the plurality of antenna elements of the antenna array 116 may be partitioned such that a first portion of antenna elements may be associated with, dedicated to, correspond to, and/or be configured to operate using a first access technology, and a second portion of antenna elements may be associated with, dedicated to, correspond to, and/or be configured to operate using a second access technology. In one embodiment, the plurality of antenna elements may be partitioned into unequal groups or, alternatively, "split" into equal halves, wherein each group or half operates to provide a coverage area for a distinct access technology when the antenna array 116 operates in a dual technology mode. Each of these operations described above may be modified or governed by network policies operating on the network baseband.

In some embodiments, the antenna array 116 is partitioned such that the first portion of antenna elements is associated with the first access technology and the second portion of antenna elements is associated with the second access technology. When the antenna array 116 is operating in a dual technology mode, each portion of the plurality of antenna elements may operate using only one distinct protocol and/or access technology relative to the other portions in the antenna array, in some embodiments. In one example, a first portion of antenna elements may operate using 5G wireless access technology and the second portion of antenna elements may operate using 4G wireless access technology. Additionally, it will be understood that the terms "first" and "second" are used herein for the purposes of clarity in distinguishing portions of antenna elements from one another, but the terms are not used herein to limit the sequence, relevance, number of portions, technological functions, and/or operations of each portion unless specifically and explicitly stated as such.

As such, the base station 112 may provide current UE 104 and 106 and legacy UE 108 and 110 with access to the network 102, in embodiments. In some embodiments, the first portion of antenna elements may communicate with current UE 104 and 106 using 5G technology, and the second portion of the antenna elements may communicate with legacy UE 108 and 110 using 4G technology. When operating in the dual technology mode, the antenna array 116 may concurrently connect to and communicate with the current UE 104 and 106 and legacy UE 108 and 110 using, respectively, at least two distinct access technologies.

Accordingly, in one example, when the antenna array 116 is operating in the dual technology mode, the base station 112 concurrently acts an eNodeB (or "eNB") and gNodeB (or "gNB"). As such, the base station 112 may provide service to one or more access technologies to both current and legacy UE. In addition to communicating with the current UE 104 and 106 and the legacy UE 108 and 110, the base station 112 may also communicate with one or more neighboring base stations. In some embodiments, the base station 112 may communicate with neighboring base station 120 using the first access technology and may communicate with another neighboring base station 122 using the second access technology. For example, because the base station 112 may operate concurrently as an eNodeB and a gNodeB using the antenna array 116 that is partitioned and operating in a dual technology mode, the base station 112 may communicate with other base station. For example, base station 112 communication may include legacy base stations that cannot use current access technologies (e.g., 5G) or current base stations that lack backward compatibility with prior access technologies (e.g., 4G). In embodiments, the base station 112 may bi-directionally exchange information with neighboring base stations 120 and 122 through an X2 interface or X2 link. Information regarding signal quality, RF conditions, one or more RLFs, and SINR levels at each of the neighboring base stations 120 and 122, and/or as reported from UE to the neighboring base stations 120 and 122 may be communicated to the base station 112 via the X2 link. Additionally or alternatively, information regarding signal quality, RLFs, and SINR levels at each of the neighboring base stations 120 and 122 may be communicated to the base station 112 over the backhaul. Each of these operations described may be modified or governed by network policies operating on the network baseband.

As mentioned, the base station 112 may include a radio and/or a controller, such as an MMU, that enables the base station 112 to adjust or modify the operations and transmissions of the plurality of antenna elements in the antenna array 116. In embodiments, the operations, configurations, and/or settings of each antenna element may be individually controlled and adjusted by the base station 112 using the controller. In some embodiments, the operations, configurations, and/or settings of the first portion of antenna elements may be controlled and adjusted as a group by the base station 112 using a controller, such as an MMU, independent of the second portion of antenna elements. In a similar fashion, the operations, configurations, and/or settings of the second portion of antenna elements may be controlled and adjusted as a group by the base station 112 using the controller, independent of the first portion of antenna elements. Accordingly, the base station 112 may use a controller to independently adjust different groups or portions of antenna elements within one antenna array.

In embodiments, the operations, configurations, and/or settings of each individual antenna element may be adjusted and customized. For example, the base station 112 instructs a portion of antenna elements to transmit one or more synchronization signals using a periodicity. In another example, the portion of antenna elements may transmit a plurality of synchronization signals using the periodicity, as instructed by the base station 112. The synchronization signals may be specific to and/or configured for the first access technology, in embodiments.

Accordingly, the base station 112 may use a controller to independently adjust different individual antenna elements, any number of groupings and/or subset(s) of each portion of antenna elements, and/or portions of antenna elements within one antenna array. In embodiments, the base station 112 may use a controller to measure and monitor one or more of throughput, signal quality metrics (e.g., SINR), a quantity of unique users/subscribers, a quantity of unique UE, and/or RLFs. Each of these operations described above may be modified or governed by network policies operating on the network baseband.

Figure 2:
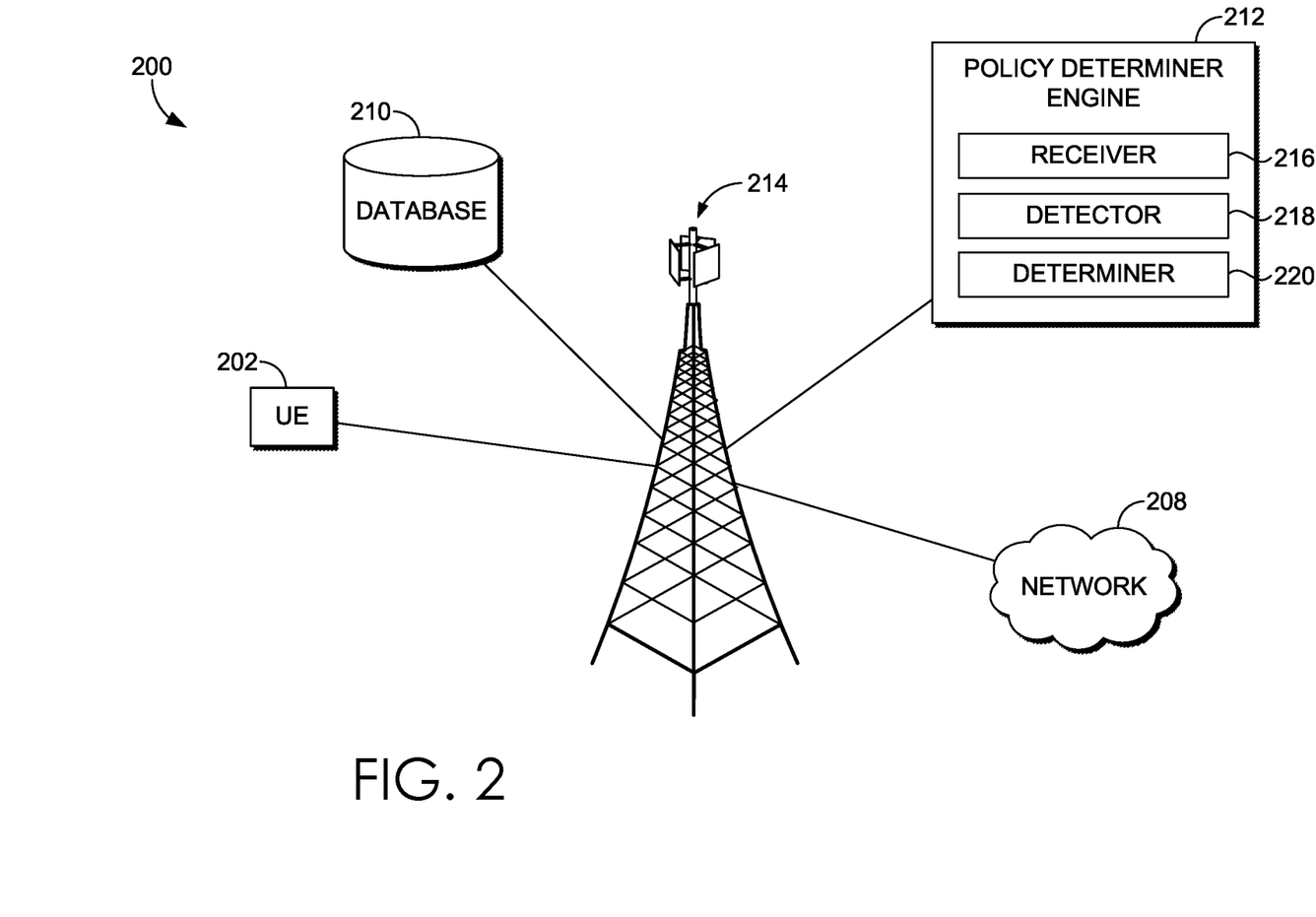
FIG. 2 depicts an exemplary telecommunications environment, in accordance with an aspect of the present invention.

Turning now to FIG. 2, network environment 200 is an exemplary network environment in which implementations of the present disclosure may be employed. Network environment 200 is one example of a suitable network environment and is not intended to suggest any limitation as to the scope of use or functionality of the present disclosure. Neither should the network environment be interpreted as having any dependency or requirement relating to any one or combination of components illustrated.

Network environment 200 includes UE 202 (network environment 200 may contain more UEs), network 208, database 210, dynamic antenna element disablement engine 212, and cell site 214. In the network environment 200, UE 202 may take on a variety of forms, such as a PC, a user device, a smart phone, a smart watch, a laptop computer, a mobile phone, a mobile device, a tablet computer, a wearable computer, a PDA, a server, a CD player, an MP3 player, GPS device, a video player, a handheld communications device, a workstation, a router, an access point, and any combination of these delineated devices, or any other device that communicates via wireless communications with a cell site 214 in order to interact with network 208, which may be a public or a private network.

In some aspects, the UE 202 corresponds to a user device or a computing device. For example, the user device may include a display(s), a power source(s) (e.g., a battery), a data store(s), a speaker(s), memory, a buffer(s), a radio(s), and the like. In some implementations, the UE 202 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the UE 202 in network environment 200 may optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2 and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and/or data services to UE 202 and any other UEs. For example, network 208 may be associated with a telecommunications provider that provides services (e.g., LTE) to the UE 202. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the UE 202 that is located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited geographical area. For the purposes of the present disclosure, it may be assumed that it is undesirable and unintended by the network 208 that the cell site 214 provide wireless connectivity to the UE 202 when the UE 202 is geographically situated outside of the cell associated with the cell site 214.

In an exemplary aspect, the cell site 214 comprises a base station that serves at least one sector of the cell associated with the cell site 214 and at least one transmit antenna for propagating a signal from the base station to one or more of the UE 202. In other aspects, the cell site 214 may comprise multiple base stations and/or multiple transmit antennas for each of the one or more base stations, any one or more of which may serve at least a portion of the cell. In some aspects, the cell site 214 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more as measured at ground level and extending outward from an antenna at the cell site. In another example, a small cell may correspond to a coverage area having a radius of approximately less than three miles as measured at ground level and extending outward from an antenna at the cell site.

As shown, cell site 214 is in communication with the dynamic antenna element disablement engine 212, which comprises a receiver 216, a detector 218, a determiner 220, and an antenna element controller 222. The dynamic antenna element disablement engine 212 may connect UE 202 and other UEs to frequency bands within range of the UE 202 or other UEs for access to network 208. The dynamic antenna element disablement engine may also delay or prevent UE 202 connection to a frequency band for access to network 208. The dynamic antenna element disablement engine 212 may communicate with the database 210 for storing and retrieving data.

For example, the receiver 216 may retrieve data from the UE 202, the network 208, the database 210, and the cell site 214. In some embodiments, the receiver 216 may receive requests from UEs for access to a particular frequency band. Further, data the receiver 216 may access includes, but is not limited to, location information of the UE 202 and channel quality information. Location information may comprise GPS or other satellite location services, terrestrial triangulation, an access point location, or any other means of obtaining coarse or fine location information. The location information may indicate geographic location(s) of one or more of a user device, an antenna, a cell tower, a cell site, and/or a coverage area of a cell site, for example. Channel quality information may indicate the quality of communications between one or more user devices and a particular cell site. For example, channel quality information may quantify how communications are traveling over a particular communication channel quality, thus indicating when communications performance is negatively impacted or impaired. As such, channel quality information may indicate a realized uplink and/or downlink transmission data rate of a cell site and/or each of one or more user devices communicating with the cell site, observed SINR and/or signal strength at the user device(s), or throughput of the connection between the cell site and the user device(s). Location and channel quality information may take into account the UE's capability, such as the number of antennas of the user device and the type of receiver used by the user device for detection. The receiver 216 may also be configured to receive information from cell sites other than cell site 214 or other processors and/or servers.

Each sector corresponds to a radiation pattern of a corresponding antenna at the cell site. The shape, size, and dimension(s) of the service coverage area of the cell site are, generally, determined by an antenna's specific radiation pattern, as well as a direction, electrical tilt, mechanical tilt, installation height above the ground or surrounding geographic area, technical operating specifications, materials, obstructions (i.e., buildings, mountains, or other elevations), and power supplied to each of the first, second, and third antennas of the cell site, for example. The first, second, and third antennas wirelessly receive and transmit RF transmissions to and from, for example, user equipment, other antennas, other cell sites, base stations, and/or satellites, in order to facilitate communications between such devices, though not shown in FIG. 2 for clarity. In an embodiment, the first, second, and third antennas of the cell site capture two-way communications between the network and UE devices 202 that are within a geographic area corresponding to the service coverage area of the cell site.

Turning to detector 218, the detector 218 may detect UEs within a range, frequency bands, sector power ratios (SPRs) of frequency bands, SINRs, and loading factors (e.g., loading volume) corresponding to frequency bands, etc. Loading factors may change depending upon the day and time of day (e.g., world events such as natural disasters, terror attacks, pandemics, or religious holidays may prompt surges of UE traffic to or from specific locations), and may be stored in the database 210. Loading factors may include cell site 214 heat signature information, cell site 214 component performance information, channel quality information, or processor load measurements. Factors affecting the heat signature information of the cell site 214 include component model, component type, manufacturer, age of a component, wear and tear due to environmental factors, etc. Further, loading factors may also include an amount of current, backhaul traffic, or an anticipated current or backhaul traffic. Additionally, factors affecting loading volume may include a quantity of users connected to a frequency band or antenna properties at a time of receiving communication parameters from UEs connected to the frequency band. Other factors affecting loading volume may also include a capability of the frequency band and data received from the quantity of users connected to the frequency band. The data received from the quantity of users may comprise a rate at which UEs are connected to and disconnected from the frequency band.

Detector 218 may also detect wireless communication protocols and wireless telecommunications networks associated with particular frequency bands. For example, the detector 218 may detect that a first wireless communication protocol of a first frequency band is a 5G wireless communication protocol and a second wireless communication protocol of a second frequency band is a 4G wireless communication protocol. Additionally, the detector 218 may detect a third wireless communication protocol of a third frequency band that comprises both a 5G and a 4G wireless communication protocol such that the network has an ability to maintain dual connectivity or a particular UE is able to connect to either 5G and 4G wireless communication protocols simultaneously.

Detector 218 may also detect information from a connected UE which indicates that the connected UE is a redcap device. For example, the detector 218 may detect that the UE device connected is a redcap device. The information detected from the connected UE may be an international mobile equipment identifier (IMEI) number. Additionally, the information detected from the connected UE may be another form of identifier which indicates that the UE is a redcap device. In one embodiment, if an identifier is not detected for the connected UE, the detector or network may assign the UE as a rogue device or a redcap device and assign a protocol based on the reduced capability assignment.

Turning to determiner 220, the determiner 220 may determine that the redcap UE is a particular type of redcap UE. For example, a redcap UE may exist as a IoT, a vehicle to vehicle, a road side unit, a drone, a sensor, a connected vehicle, a connected UAV, machine type sensors, a smart device, or any other type of redcap device. By determining the type of redcap device the connected UE is, the network may then tailor a traffic steering policy for that connected UE and any other connected UEs connected to the network. This information may be provided by network sources in a near real-time manner.

Determiner 220 may also determine a data requirement for the connected redcap UE. Determiner 220 may utilize information related to the redcap UE in order to determine what data or other requirements are required for the redcap UE. For instance, a redcap UE may have a particular bandwidth requirement because of a recent software update. In exemplary embodiments, the determiner 220 may use information from historical data, empirical test measurements, global database, manufacturers' devices software update, network information from the RAN (frequency selection, 4G/5G, QoS, resource allocation, 911 call, etc.), device information, device temperature (overheating), speed, location/time, and other event information such as a triggering event (fire, shooting, outbreak, alarm, etc.) over social media platforms (Instagram, twitter, Facebook, etc.) to identify and determine the data or other device requirements. This information may be used in connection with the type of redcap UE to determine correlated insights into what data requirements or policy requirements (such as a change in beam shape or communication protocol assignment) may be required of the core network. Additionally, the determiner may determine a security risk for the connected redcap UE which may be used in determining the correlated insight for the UE. From these correlated insights, determiner 220 may determine data requirements, security risk, device requirements such as needed bandwidth or throughput, or other UE requirements.

Determiner 220 may then use the correlated insights to determine a policies which may direct network functions of the core network continuously. Exemplary policies are provide in Table 1 below. For example, a static grouping of redcap devices may be identified, such as a camera sensors. From the information determined about that device (location, data requirement, type of device, trigger event, low security risk), a policy may be determined that the redcap UEs identified needs to be prioritized under a 5G protocol operating at 28 GHz. This policy may then be implemented using a near-realtime radio intelligence controller (Near-RT RIC) O-RAN baseband.

|  | Sources-Device | Sources-Network | Sources-Database | Sources-Event Trigger | Security Risk | Policy to Network |
|---|---|---|---|---|---|---|
| Static Redcap Devices |  |  |  |  |  |  |
| camera sensors | Location | Frequency/Load/KPI | Golbal/Vendor Database | Social Media | L | Prioritize 5G, 28 GHz to this group of UEs |

-continued

| | Sources-Device | Sources-Network | Sources-Database | Sources-Event Trigger | Security Risk | Policy to Network |
|---|---|---|---|---|---|---|
| IoT meter sensors | Location | Frequency/Load/KPI | Golbal/Vendor Database | — | M | Prioritize 3G, 1.9 GHz to this group of UEs |
| Moving RedCap Devices | | | | | | |
| wearables | Location/Speed/Other | Frequency/Load/KPI | Golbal/Vendor Database | Social Media | H | Prioritize 4G, 2.1 GHz to this group of UEs |
| V2X sensors | Location/Speed/Other | Frequency/Load/KPI | Golbal/Vendor Database | Social Media | M | Prioritize 5G, 2.5 GHz to this group of UEs |
| no name/black market | Unknown | Frequency/Load/KPI | Golbal/Vendor Database | Social Media | H | Prioritize 4G, 700 MHz to this group of UEs |

Figure 3:
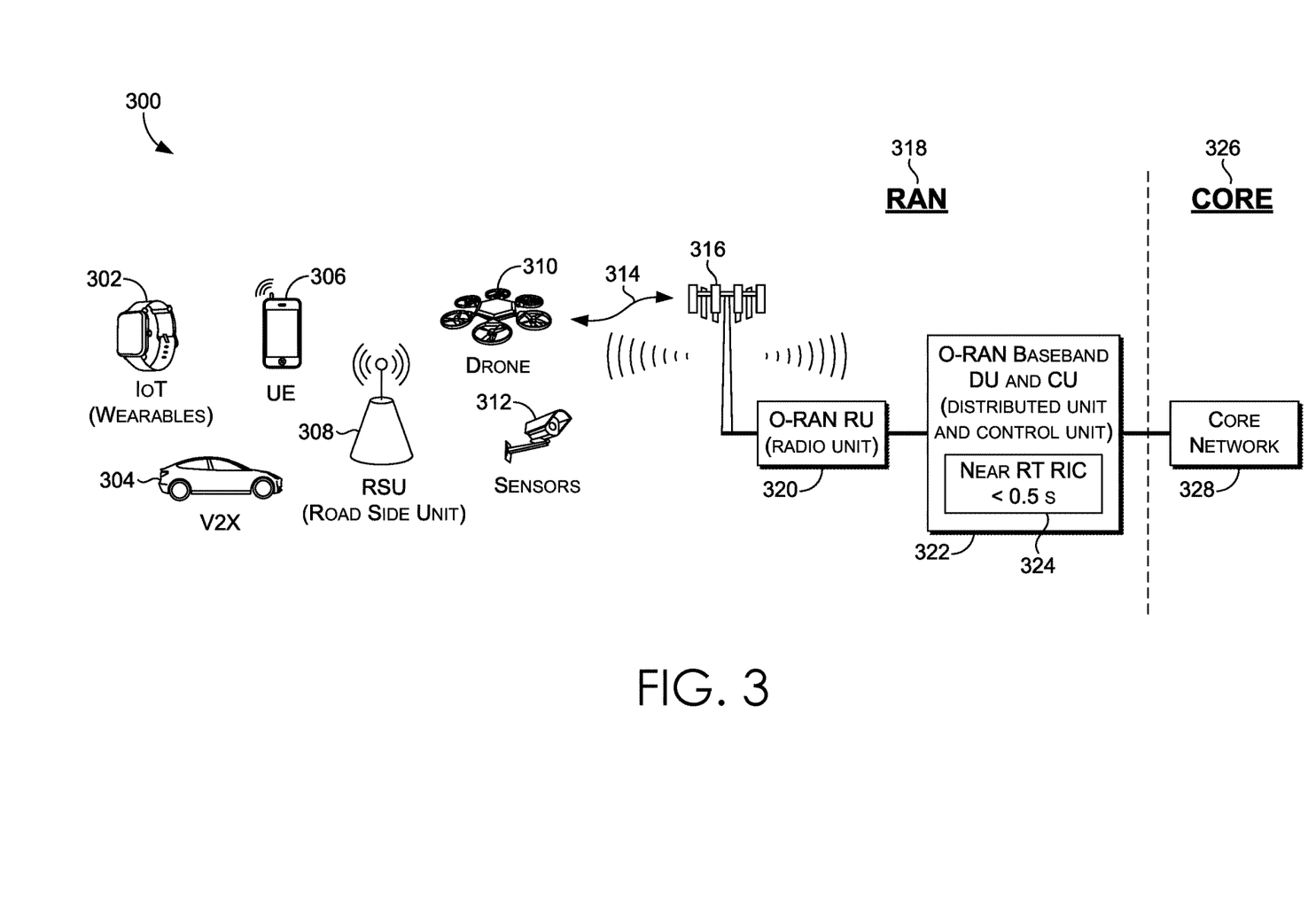
FIG. 3 depicts an exemplary telecommunications environment, in accordance with an aspect of the present invention.

Turning now to FIG. 3, exemplary multiple communication protocol environment 300 comprises base station 316, which may include a first antenna array; one or more antennas; a main lobe area of a communication protocol, one or more side lobe areas of a communication protocol, and a back lobe area of a communication protocol. The location, shape and size of each of the three lobes is determined at least in part by the shape and size of the antenna array. In aspects, the one or more antennas may be dipole antennas, having a length, for example, of ¼, ½, 1, or 1½ wavelength. In aspects, the first antenna array may be an active antenna array, FD-MIMO, massive MIMO, 3G, 4G, 5G, and/or 802.11. While we refer to dipole antennas herein, in other aspects, the one or more antennas may be monopole, loop, parabolic, traveling-wave, aperture, yagi-uda, conical spiral, helical, conical, radomes, horn, and/or apertures, or any combination thereof. It is noted that adjusting one or more individual power supplies to the one or more antennas of the first antenna array may be applicable to an antenna array comprising any type of antenna targeting any portion of the RF spectrum (though any lower than VHF may be size prohibitive). In one aspect, the one or more antennas may be configured to communicate in the UHF and/or SHF spectrum, for example, in the range of 1.3 GHz-30 GHz.

By way of a non-limiting example, the first antenna array may comprise 64 antenna elements arranged in an 8×8 structure. In other aspects, the first antenna array may comprise antenna elements arranged in an 8×4, 4×8, or 4×4 configuration. Each antenna element of the first antenna array comprises a dedicated power supply having a certain phase and amplitude to a respective antenna element. In an aspect, the power supply comprises a power amplifier. In an aspect not depicted in the figures, the base station may further comprise a processor. The processor may be one or more of processors, servers, computer processing components, or the like. In some aspects, the processor may be communicatively coupled to each node and/or to each antenna of each node.

In certain aspects, the first antenna array may communicate or is capable of communicating with devices, using a 5G wireless communication protocol. While in this example 5G is mentioned as a wireless communication protocol, it should be understood that any wireless communication protocol standard may be utilized, for example, 3G, 4G, LTE, 5G, 802.11, or any other operator-elected wireless communication protocol standard. In the aspect, the first antenna array can include 64 antenna elements, each with a distinct direction which may be known, and where each antenna element is capable of communicating with one or more devices, e.g., using one or more specific beams, each identifiable as a beam index, as referred to herein, in aspects. In the same or alternative aspects, a device may communicate with more than one antenna element of the first antenna array. In aspects, using the methods and systems disclosed herein with a high-density antenna array, such as the first antenna array, and using a 5G wireless communication protocol as an example, can facilitate the strategic assignment of beam indices and/or allotment of beam indices tailored for a specific purpose or environment.

The O-RAN industry alliance defines an O-RAN architecture, and introduces two-stage non-real-time and real-time RAN intelligent controller (RICs) on the basis of a 5G access network architecture and function virtualization. The RIC mainly utilizes data analysis and an artificial intelligence engine to sense and predict the wireless network environment and make decisions on allocation of wireless resources. According to the processing time delay characteristic, the RIC is divided into a Non-real-time wireless network intelligent controller Non-RT RIC and a Near-real-time wireless network intelligent controller Near-RT RIC. The Near-RT RIC can realize Near-real-time control and optimization of RAN elements and resources through fine-grained data collection and operation through an E2 interface; Non-RT RIC supports Non-real-time control and optimization of RAN elements and resources, and application/function guidance for policy-based near-RT RIC. The non-RT RIC supports the import of customized strategies and the generation of policies to be implemented using those customized strategies in relation to redcap devices and network capabilities. Near real-time RIC supports online real-time execution of policies directing baseband functions to prioritize specific groups of users and devices continuously.

The RAN 318 can include one or more access nodes that enable connection 314. These access nodes (ANs) can be referred to as base stations 316, NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, the communication nodes can be transmission/reception points (TRPs). In instances when the base station 316 is a NodeB (e.g., eNBs or gNBs), one or more TRPs can function within the communication cell of the NodeBs. The RAN 318 is shown to be comprised of a radio unit 320 and a baseband 322 consisting of a distributed unit and control unit. Operating within the O-RAN baseband is a near RT-RIC 324 which may operate in control loop cycles of less than 0.5 seconds.

Core 326 consists of the management portion of the network system and comprises at least a core network 328 and a service management and orchestration framework (SMO) containing a non-RT RIC. The RAN 318 is shown to be communicatively coupled to a core network (CN) 328 within the core 326. In aspects, the CN 328 may be an evolved packet core (EPC) network, a NextGen Packet Core (NPC) network, or some other type of CN.

In some embodiments, the near-RT RIC 324 is a function that sits within O-RAN baseband 322 in the O-RAN architecture. The primary goal of near-RT RIC 324 is a logical function that enables near-real-time control and optimization of RAN elements and resources via fine-grained data collection and actions over the E2 interface for a near-real-time interval (i.e., less than 500 ms), policy optimization in RAN. The policy optimization including the traffic steering policies determined by determiner 220 which prioritizes policies for particular UEs based on the policy determined. Such group prioritizing policies may include re-distributing or re-allocating base station resources to prioritize groups of UEs. Such re-allocations may be accomplished through a variety of means not limited to beam steering, re-assignment of communication protocols to the connected UE, or any other re-allocation of resources.

Figure 4:
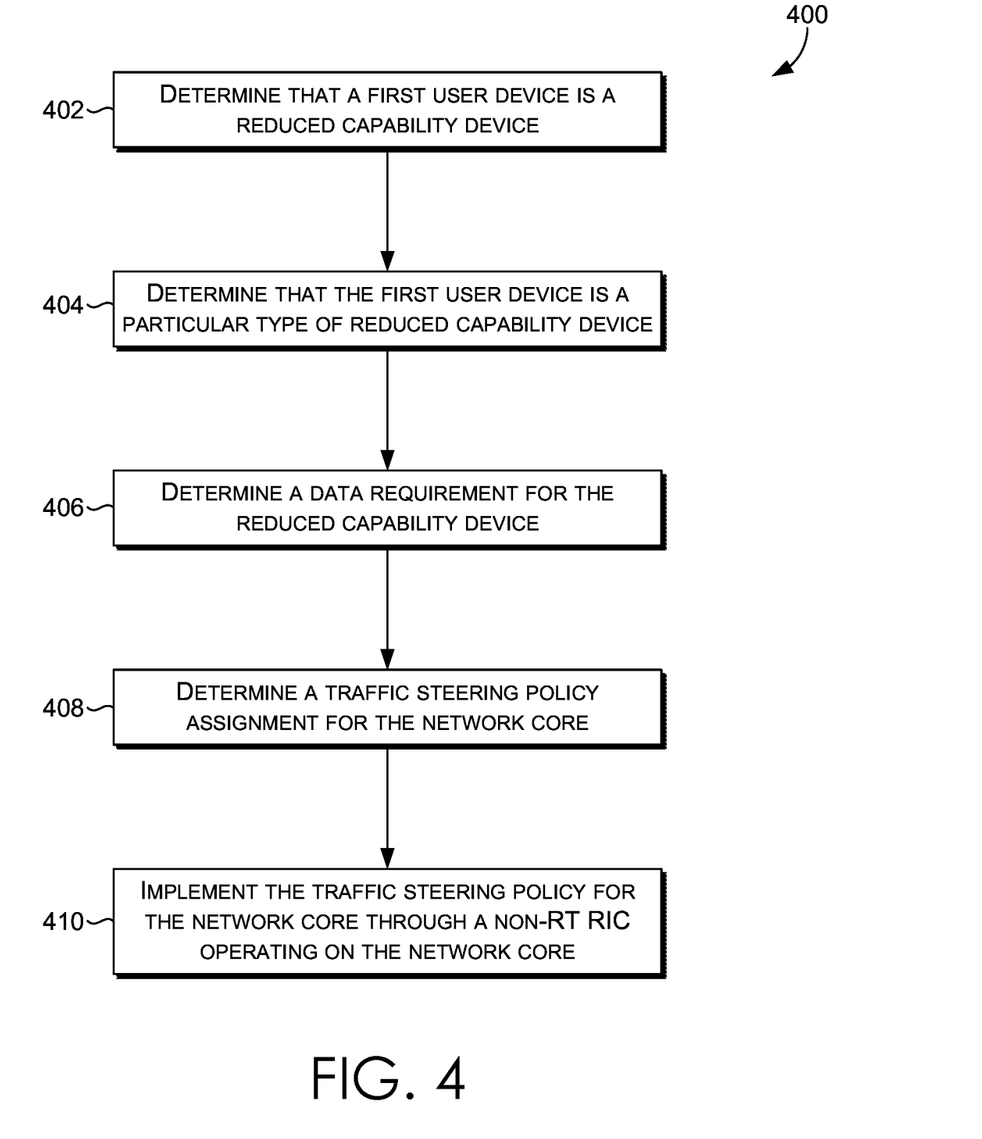
FIG. 4 depicts an exemplary flowchart of a method for managing a baseband network policy, in accordance with an aspect of the present invention.

Turning now to FIG. 4, flow diagram 400 comprises an exemplary method dynamically modifying the policies associated with the O-RAN baseband DU and CU of a network. Initially at block 402, it is determined that a first user device is is a reduced capability device. At block 404, it is determined that the first UE associated with the first base station is a particular type of reduced capability device. For example, the types of reduced capability devices may be a sensor, an IoT meter, a camera, a V2X sensor, or a black market device. At block 406, the data requirements or the requirements of the reduced capability device is determined such that a correlation or an insight can be made for the user device. At block 408, a traffic steering policy is determined for the network core based on the insights determined from the device requirements and the device type. At block 410, the traffic steering policy or UE group prioritization policy for the network core is implemented through the near-RT RIC operating on the O-RAN baseband.

Figure 5:
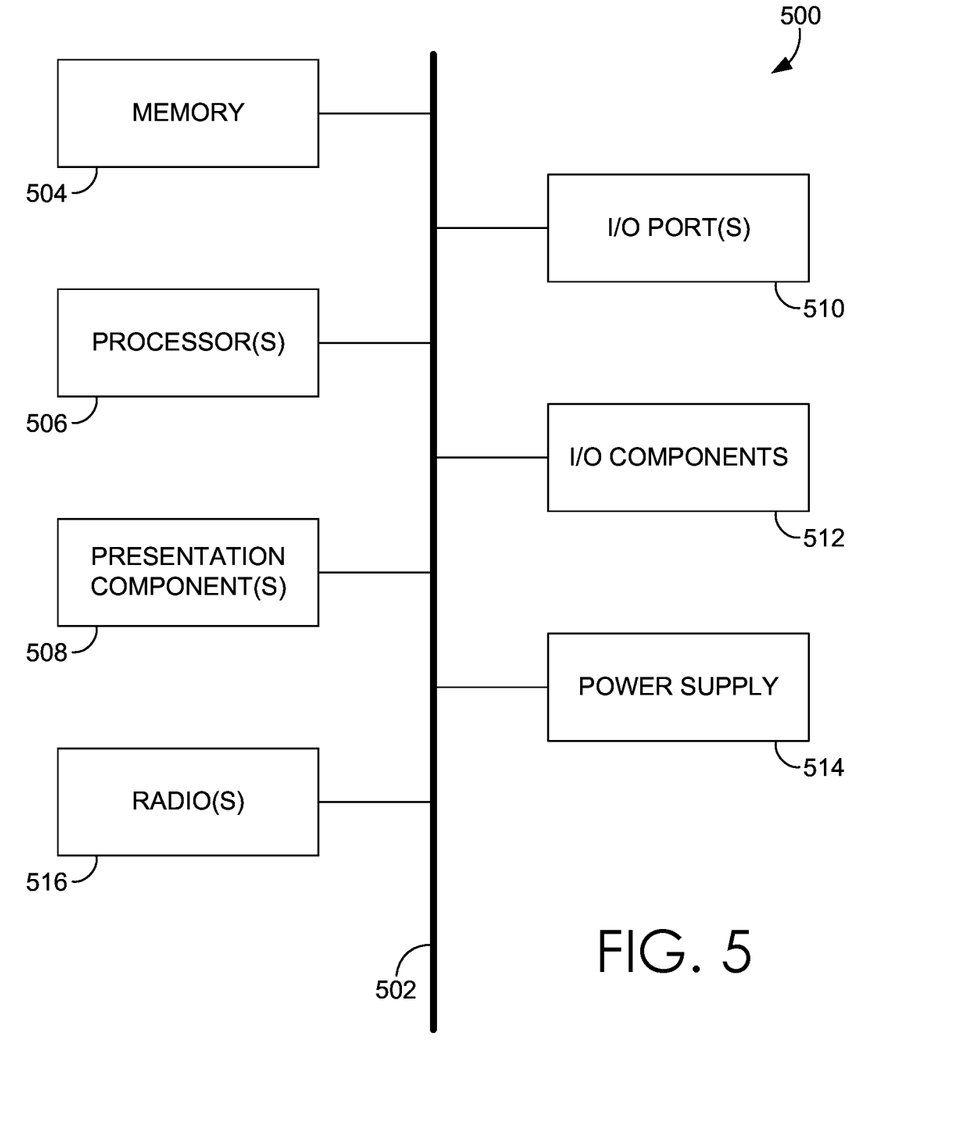
FIG. 5 depicts an exemplary computing device suitable for use in implementations of aspects herein.

Referring now to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, power supply 514 and radio(s) 516. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component, such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 504 includes computer-storage media in the form of volatile and/or nonvolatile memory. Memory 504 may be removable, non-removable, or a combination thereof. Exemplary memory includes solid-state memory, hard drives, optical-disc drives, etc. Computing device 500 includes one or more processors 506 that read data from various entities, such as bus 502, memory 504, or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices, including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments of this technology have been described with the intent to be illustrative rather than be restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. One or more non-transitory computer-readable media having computer-executable instructions embodied thereon that, when executed, perform a method for managing a baseband network policy, the method comprising:
    determining that a first user device is a reduced capability device, the first user device being associated with a first base station, wherein the determining that the first user device is reduced capability is determined using an identifier received from the first user device;
    determining that the first user device is a particular type of reduced capability device;
    determining a data requirement for the particular type of reduced capability device from network sources;
    identifying, based on the data requirement and the particular type of reduced capability device, a baseband policy assignment for a network baseband operating on an open radio access network, where the baseband policy assignment modifies the network traffic steering; and
    implementing the baseband policy assignment for the network baseband through a near-real time RAN intelligent controller operating on a baseband core.

2. The media of claim 1, wherein the particular type of reduced capability device is determined using historical data and empirical test measurements.

3. The media of claim 1, wherein the data requirement of the reduced capability device is determined using monitored key performance indicators and device information.

4. The media of claim 3, wherein the data requirement is further determined using triggering event.

5. The media of claim 3, wherein the device information comprises physical information related to the first user device.

6. The media of claim 1, wherein the determination steps and implementation steps are performed using the near-real time RAN intelligent controller.

7. The media of claim 6, wherein the near-real time RAN intelligent controller is associated with a service management orchestration module on the network core.

8. A method for managing a traffic steering policy for a network core, the method comprising:
    determining that a first user device is a reduced capability device, the first user device being associated with a first base station, wherein the determining that the first user device is reduced capability is determined using an identifier received from the first user device;
    determining that the first user device is a particular type of reduced capability device;
    determining a data requirement for the particular type of reduced capability device from network sources;
    identifying, based on the data requirement and the particular type of reduced capability device, a baseband policy assignment for a network baseband operating on an open radio access network, the baseband where the baseband policy assignment modifies the network traffic steering; and
    implementing the baseband policy assignment for the network baseband through a near-real time RAN intelligent controller operating on a baseband core.

9. The method of claim 8, wherein the particular type of reduced capability device is determined using historical data and empirical test measurements.

10. The method of claim 8, wherein the data requirement of the reduced capability device is determined using monitored key performance indicators and device information.

11. The method of claim 10, wherein the data requirement are further determined using a trigger ng event.

12. A system for managing a traffic steering policy for a network core, the system comprising:
    one or more computer components configured to perform a method comprising:
        determining that a first user device is a reduced capability device, the first user device being associated with a first base station;
        determining that the first user device is a particular type of reduced capability device;
        determining a data requirement for the particular type of reduced capability device from network sources;
        identifying, based on the data requirement and the particular type of reduced capability device, a baseband policy assignment for a network baseband operating on an open radio access network, the baseband where the baseband policy assignment modifies the network traffic steering; and
        implementing the baseband policy assignment for the network baseband through a near-real time RAN intelligent controller operating on a baseband core,
    wherein the determination and implementation are performed using the near-real time RAN intelligent controller.

13. The system of claim 12, wherein the data requirement of the reduced capability device is determined using monitored key performance indicators and device information.

14. The system of claim 13, wherein the data requirement is further determined using a triggering event.

15. The system of claim 14, wherein the device information comprises physical information related to the first user device.

16. The system of claim 12, wherein the near-real time RAN intelligent controller is associated with a service management orchestration module on the network core.

17. The system of claim 12, wherein the determining that the first user device is reduced capability is determined using an identifier received from the first user device.

* * * * *